United States Patent [19]

Lawson

[11] Patent Number: 6,079,775
[45] Date of Patent: *Jun. 27, 2000

[54] SEAT FOR A BICYCLE

[75] Inventor: Donald Garth Lawson, Kwa Zulu Natal, South Africa

[73] Assignee: Supaseat Holdings Limited, St. Helier, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 09/240,628

[22] Filed: Feb. 1, 1999

[30] Foreign Application Priority Data

Jul. 7, 1998 [ZA] South Africa ............................ 98/5963
Jul. 7, 1998 [ZA] South Africa ............................ 98/5964

[51] Int. Cl.⁷ ....................................................... B62J 1/00
[52] U.S. Cl. ............................... 297/215.14; 297/215.16; 297/202
[58] Field of Search ........................... 297/195.1, 195.11, 297/202, 214, 215.14, 215.13, 215.16, 311

[56] References Cited

U.S. PATENT DOCUMENTS

| 3,712,670 | 1/1973 | Svehla et al. ...................... 297/214 X |
| 4,108,462 | 8/1978 | Martin ............................ 297/215.14 X |
| 4,572,575 | 2/1986 | Golden et al. ......................... 297/214 |
| 4,773,705 | 9/1988 | Terranova ......................... 297/215.14 |

*Primary Examiner*—Anthony D. Barfield
*Attorney, Agent, or Firm*—Young & Thompson

[57] ABSTRACT

A bicycle seat has no horn and permits an even weight distribution on the ischia of the cyclist as well as permitting unobstructed pedalling and correct positioning in relation to the handlebars and pedals to maximize efficiency and comfort of pedalling. The seat has a wide rear portion moulded to support the buttocks at both the rear sides and a front portion which has a leading edge extending at right angles to the frame. The leading edge lies in the physiological creaseline of the cyclist between the thighs and buttocks. The seat is attached to the seat post close to its leading edge.

10 Claims, 5 Drawing Sheets

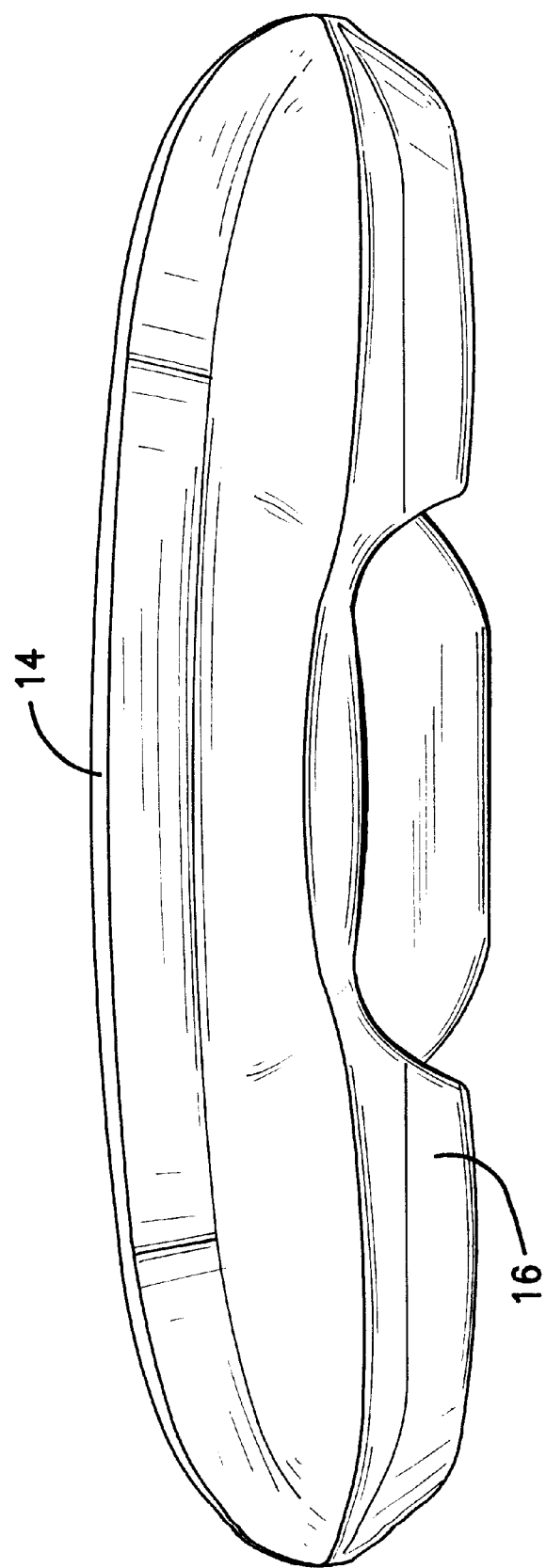

SEAT FOR A BICYCLE

FIELD OF THE INVENTION

This invention relates to a seat for a bicycle.

BACKGROUND OF THE INVENTION

Saddle discomfort is a major problem that millions of cyclists experience every day. And saddle-induced pain is the major reason why millions of non-cyclists who would like to cycle, don't. For decades, bicycle manufacturers have been aware of these shortcomings. Dozens of different saddle designs have been experimented with, and today there are literally hundreds of different bicycle designs to choose from . . . all kinds of shapes, sizes and materials. Not one is the solution to saddle discomfort and pain.

Genital numbness occurs in both men and women, but is more common in men. It is usually the result of saddle pressure on the two pudendal nerves in the crotch. This may be caused by a variety of conditions. Attempts to alleviate the condition include avoiding hill climbing in a seated position, moving about on the saddle from time to time, standing to pedal occasionally, or assuming a more upright position.

It is usually best that the saddle be level rather than tipped up or down, but slightly lowering the nose of the saddle may help. Some riders tilt up the nose of the saddle to force a more upright position. The saddle may also be too high. Leg extension should be about 95% with the pedal at 6 o'clock, and the hips should not rock when the pedals are moved backward with the heels. These are however cyclists' responses or adaptations to the situation which are simply treatments for the symptoms and not the cause.

A saddle that is too hard may cause problems, especially if it is made out of hard plastic that will not adjust to one's body over time. Hard leather saddles adjust to a cyclist's body if treated correctly. A soft saddle should be avoided since it can cause more problems than it solves. One that gives slightly is all that is needed.

Too long a reach on the handlebar stem extension can also cause numbness, but the stem must be replaced to fix this. The saddle should not be moved forward to alleviate the problem. Moving the saddle fore and aft should only be done to put the knees over the pedal spindles.

Not particular to women, but common to them, is having a saddle too narrow to support the ischia, or "sit-bones." Having the seat too far from the handlebars is especially common for women riding a bike sized for a man—as most of them still are. The saddle should not be fore and aft to compensate for the stem reach. Saddle adjustment should only be done to correctly position the knees over the pedal spindles. If the saddle is too far back, a shorter stem extension. is required.

Ischial Bursitis is another fairly common problem. This is an inflammation of the fluid filled sacs that are a natural cushion over the ischia. Increased conditioning and adjustment of the saddle may relieve the condition, but invariably the problem lies with the type of saddle being ridden.

Recently another potentially more serious problem has begun to emerge . . . that of physical damage over time to the genitals leading to sexual dysfunction.

A urologist at the Boston University Medical Centre in the USA estimates that he sees six cases of bicycle-related impotence each week. The problem is anatomy vs. the bicycle saddle. A person's body is designed so that when one sits down, one's weight is distributed on two sit bones, the ischia. These are protected by muscle and fat, and they contain no arteries or anything else of importance that could be crushed by a person's body weight. This area is custom-made for sitting on flat surfaces such as chairs.

However a bicycle saddle is much narrower and fits between the sit bones, with a smaller protrusion tucked up in the crotch. It is in this area that the body accommodates nerves and arteries leading to the penis. These arteries are responsible for the blood flow that causes erections. If they are crushed, blood cannot get to the penis. Once crushed, arteries don't always bounce back. Any pain or numbness felt after a long ride is not an innocent inconvenience—it could mean trouble. For with no blood reaching the penis, there's no erection.

When one sits on a chair, no blood is obstructed through these arteries. When a person sits on a narrow bicycle saddle, there is a 66 percent reduction in the blood flow. Overall, there are about 100,000 men in the USA who have problems with impotence because of bicycle-related damage.

Women are not immune either. When members of a Boston-area cycling club were surveyed, not only impotence found in men but also complaints about diminished sexual sensation and drive from women. Women's physiology in this particular area is similar to men's, and it is suspected that similar injuries occur in women.

Problems with the traditional bicycle saddle therefore are two-fold:

Firstly the saddle horn is a major obstruction and causes discomfort across a wide range of degrees of pain.

Secondly the lack of support for the buttocks, and especially the ischia bones, forces much of the body weight to be taken up along the crotch-sphincter-coccyx line, with its attendant discomfort, pain and potentiality for impotency.

However it has been found that saddle discomfort cannot be examined purely from the point of the shape, hardness and texture of the saddle. Whilst the saddle design is very important, the key to a particular cyclist establishing a comfortable and efficient riding position is the establishment of the correct triangulation relationship between the handlebars and the crank axle, the crank axle and the seat and the seat and handlebars, for the size and shape of the cyclist in question.

Of these three points, the crank axle at the bottom of the inverted triangle is fixed, and therefore it is only the positions of the handlebars and seat which can be manipulated in the design/manufacturing stage, or tuned in the field by way of an adjustable handlebar stem and an adjustable seat post.

Handlebar stem adjustment is critically dependent on the saddle being in the correct position before the stem is installed.

Thus the position of the seat is in effect the determining aspect of correct triangulation. And this depends most of all on selecting a frame with the appropriate seat tube angle, with alteration of seat post angle and seat post length providing adjustment options of lesser importance than starting with the correct seat post angle in the first instance.

The seat tube angle is measured between the top tube (the crossbar) and the seat tube (which takes the seat post) where they join under the seat. In terms of frame geometry, this angle has varied over the years but generally the seat tube angle can be anywhere from 68 to 75 degrees (90 degrees being vertical).

Selection of the correct seat tube angle is key to acquiring the bicycle most suitable for the purpose the rider has in mind to use it for e.g. racing, cruising, mountain trailing, and the like.

For every one degree of change in the angle of the seat post, on a 30 cm seat tube the alteration in the position of the top of the seat tube is only 5.3 mm. Nevertheless, this relatively small change in triangulation makes a big difference to the overall handling of a bicycle. This is the major reason why, having selected a frame with the most appropriate seat tube angle for their purpose, if professional cyclists then need to make saddle adjustments these are only of one or two millimeters at a time. relatively Further, being situated at the top of the seat post, how the seat (or saddle) is positioned in relation to the seat tube is of critical importance in regard to the physical comfort and pedalling efficiency/effectiveness of the cyclist.

In this application, that applicant proposes that the physiological curve (or crease) of the cyclist at the line where the forward portion of the buttock and the posterior portion of the thigh critically needs to lie on the line of the upward extension of the front edge of the seat tube leading into the underside of the seat. It has been discovered that this principle must be followed within the constraints of a few millimeters if the cyclist is to be able to complete the correct triangulation of seat-handlebars-crank axle.

If this creaseline is too far forward of the seat tube extension line; the cyclist loses pedal leverage which decreases pedalling power and causes leg strain on hills, and the handling of the bicycle is adversely affected. If it is too far back, it will lead to back strain.

It is at this point where prior art seating arrangement have failed. For some time it has been recognised that the horn should be dispensed with and that the buttocks require better support.

In some cases the prior art patents has also recognised the fact that the position and shape of the leading edge of the seat should correspond with the physiological curve (or crease) between the posterior portion of the thigh and the anterior portion of the buttock of the cyclist. This allows the cyclist's genitalia to lie forward and clear of the seat and reducing if not removing completely the risk of damage and impotence.

However in none of the prior art examined, have the applicants' taken into account of the interaction of the seat shape, the positioning of the leading edge of the seat in relation to the physiological creaseline described above as well as the relative positions of the leading edge of the seat and the seat-post. It is this positioning which is also critical and in the prior art examined it was found that the seat post did not fit immediately under the physiological creaseline of the cyclist when positioned correctly on the seat. As a result the cyclist was either positioned too far forward in some case, or in most cases, too far back. This not only leads to inefficient pedalling, but also discomfort and possible injury. This factor was missing in all prior art patents examined of which the most relevant were found to be Scarcella (U.S. Pat. No. 0,326,782), White (U.S. Pat. No. 0,348,785), Cesar (U.S. Pat. No. 0,370,132), Marchello (U.S. Pat. No. 3,874, 730 and U.S. Pat. No. 4,176,880), Barker (U.S. Pat. No. 4,387,925), Golden (U.S. Pat. No. 4,572,575—expired), Gordon (U.S. Pat. No. 4,613,187—expired), Terranova (U.S. Pat. No. 4,773,705—expired), Rollman (U.S. Pat. No. 4,850,643—expired), Hobson (U.S. Pat. No. 4,877,286— expired), Sunshine (U.S. Pat. No. 4,950,004), Hodges (U.S. Pat. No. 5,123,698—expired) and Denisar (U.S. Pat. No. 5,387,025).

It is therefor an object of this invention to provide a bicycle seat in which the seat post fits immediately under the creaseline of the rider when the rider is correctly positioned on the seat causing the rider to be ideally positioned on the bicycle in terms of pedalling power, pedalling efficiency and comfort.

It is a further object of the invention to provide a bicycle seat which places the rider in the ideal position on a bicycle frame as determined by scientific principles as enumerated earlier, and which provides the most in terms of comfort and protection because it leaves the legs and genitalia area forward of, and therefore completely clear of, the leading edge of the seat and takes the full sitting weight of the body on the buttocks which is their essential purpose in the first place. This completely eliminates the possibility of pressure, pain and damage to the crotch area, removes concerns about possible saddle-caused impotency, and enables the legs to move freely in the desired cycling action without friction between the legs in and around the inner thigh and crotch area.

THE INVENTION

According to the invention, an arrangement for a bicycle seat includes a surface having a rear portion molded to support the rear and sides of the buttocks at least in part and a wide section having a raised formations at the periphery thereof; and a front portion having a horizontal leading edge extending substantially transversely to the frame of the bicycle, the seat being dimensioned for the leading edge thereof to abut the zone between the posterior of the thigh and the anterior of the buttocks of a seated cyclist; the seat being attachable to the seat post at a point at or close to the leading edge of the seat; and mounting means for attachment to the seat post.

In the preferred form of the invention the mounting means permits adjustable alignment of the seat post and the leading edge from a point at the leading edge to a point 25 millimeters rearwardly of the edge.

The surface may further include in the rear wide portion thereof, a pair of spaced apart depressions for receiving a cyclist's buttocks in the region of the ischia bones.

The seat of the invention as described is molded to support the cyclist's buttocks with the peripheral rim serving this purpose. This also assists in positioning the body naturally on the seat.

Furthermore the presence of the depressions relieves the pressure placed on the cyclist's ischia.

The front of the seat has no horn, but instead the leading edge of the seat runs at right angles to the bicycle frame and aligns with the physiological creaseline falling in the zone between the thighs and buttocks of the cyclist. This positioning allows the genitalia of the cyclist to lie forward and clear of the seat itself with the result that little or no pressure is placed on the pudendal nerves. This reduces the likelihood of discomforts such as numbness and also the potential for long term damage to the genitalia in the form of saddle induced impotence.

The positioning of the seat post close to the leading edge of the seat permits the cyclist to adopt a proper position on the bicycle in relations to the seat—handlebars—pedals triangle and in so doing permits seating in a manner which is comfortable, allows a free and unencumbered pedalling motion without friction between the legs in and around the inner thigh and crotch area.

EMBODIMENT OF THE INVENTION

An embodiment of the invention is described below with reference to the accompanying drawings in which:

FIG. 3 is a front view;

Figure 7:
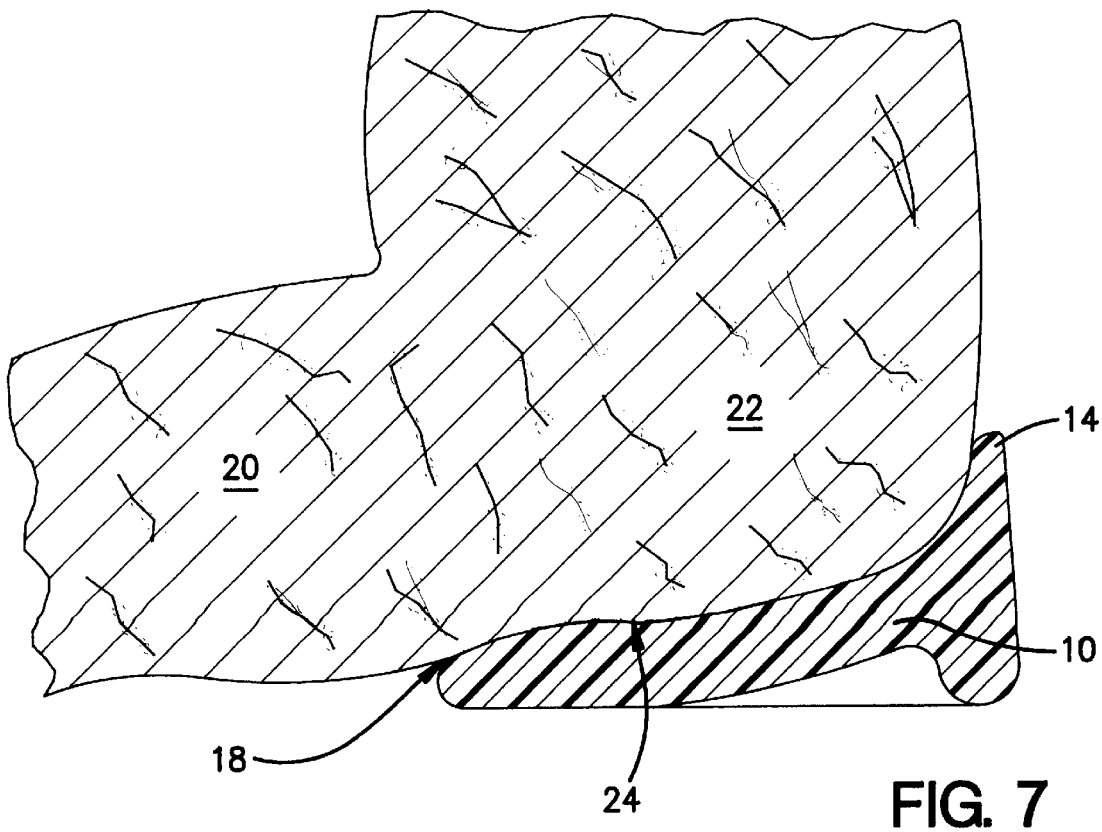
FIG. 7 is a sectional side view with seated rider.

In the drawings a bicycle seat 10 comprises a supporting surface with a rear portion 12 which is wide and molded to support the rear and sides of the buttocks (see FIG. 7). Peripheral rim 14 performs the support function.

The front portion of the seat has no horn but instead has a leading edge 16 which lies at right angles to the bicycle frame. The seat is dimensioned such that when a rider is seated, the leading edge 16 is positioned in the zone 18 (FIG. 7) between the posterior of the thigh 20 and the anterior of the buttock 22. The leading edge may be slightly arcuate and rounded for comfort.

This shape allows the cyclist to be comfortably seated with his weight distributed evenly on the ischia instead between them on the crotch-sphineter-coccyx line. Furthermore the buttocks are well supported from the sides and from the rear, while the position of the leading edge of the seat which is tucked into the physiological creaseline 18 of the cyclist between the thighs and buttocks permits the legs to pedal freely unobstructed by a horn. Depressions may be provided at 24 to further accommodate the ischia.

Figure 1:
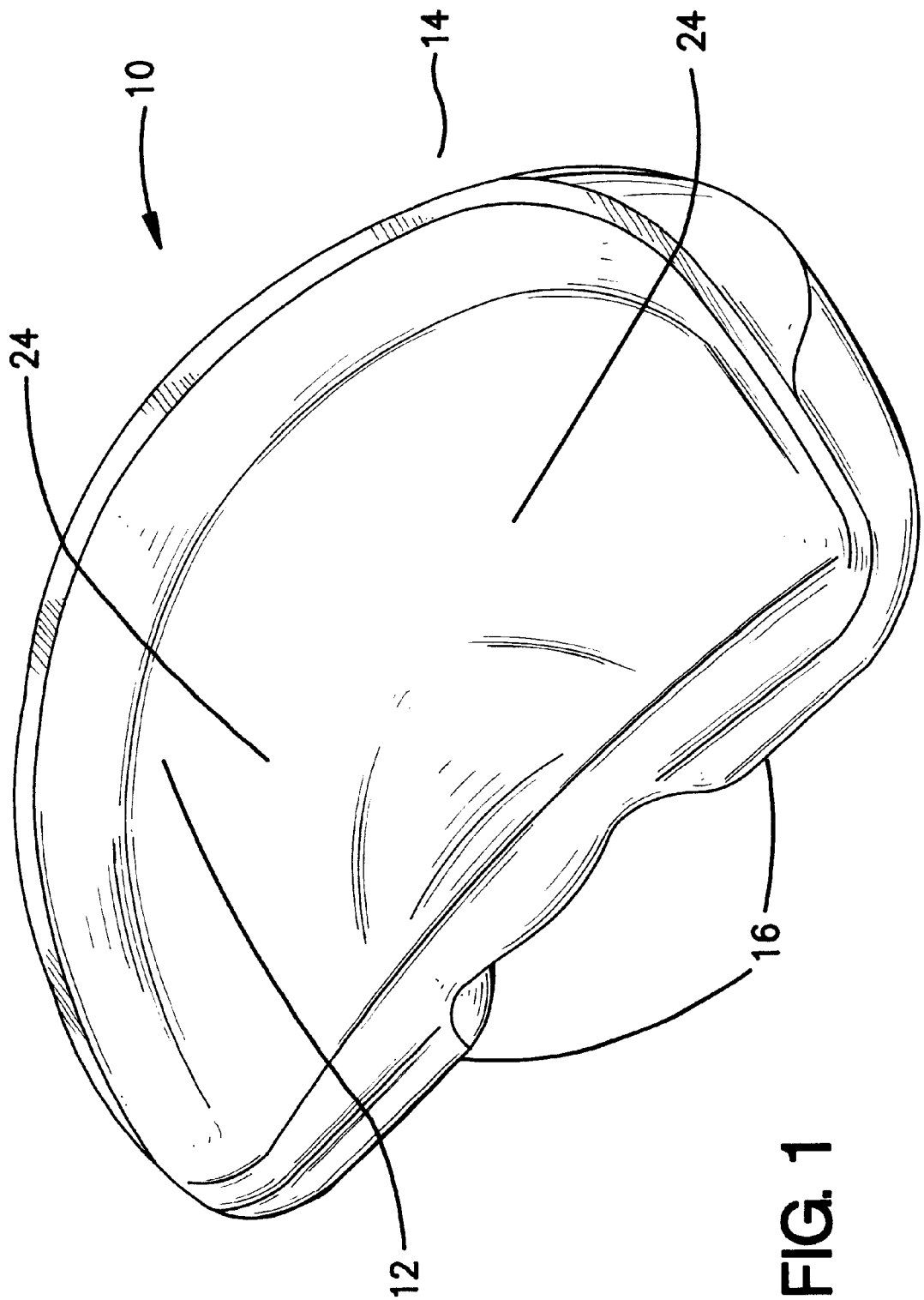
FIG. 1 is an isometric view of a seat according to the invention.
Figure 2:
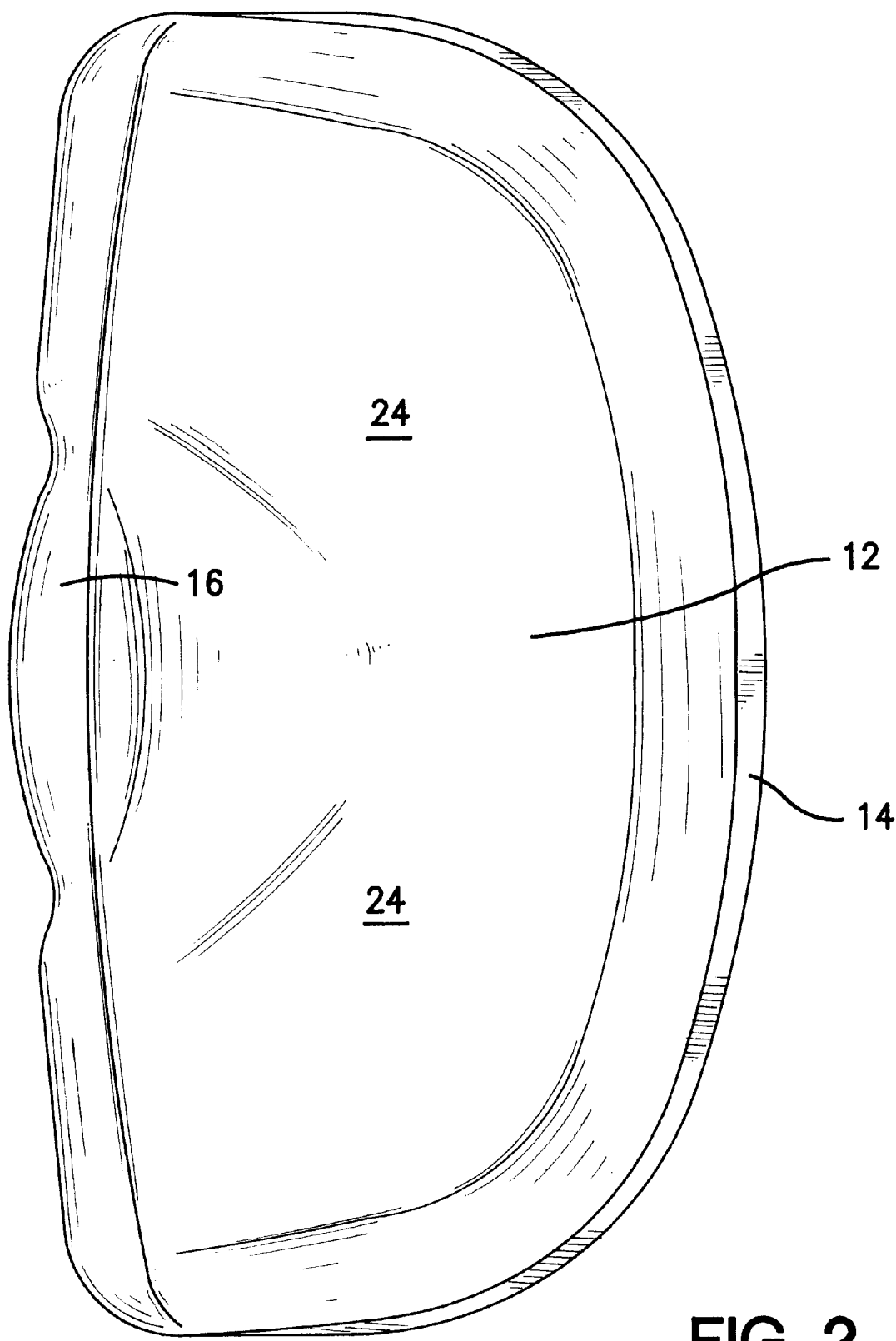
FIG. 2 is a top view of the seat.
Figure 5:
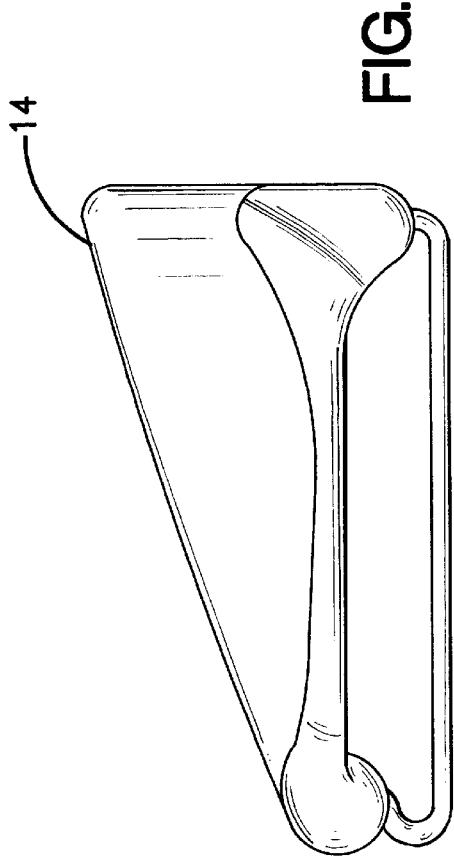
FIG. 5 is a side view.
Figure 4:
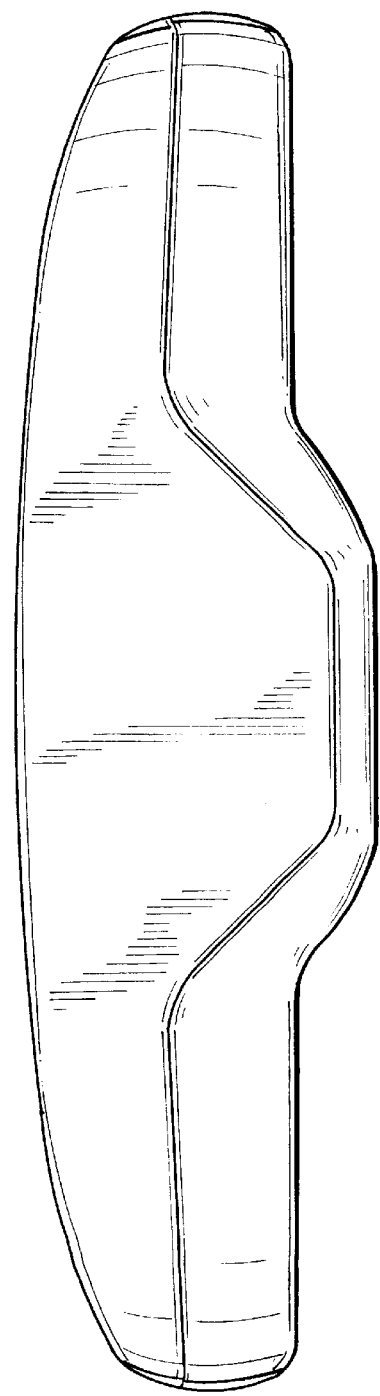
FIG. 4 is a rear view.
Figure 6:
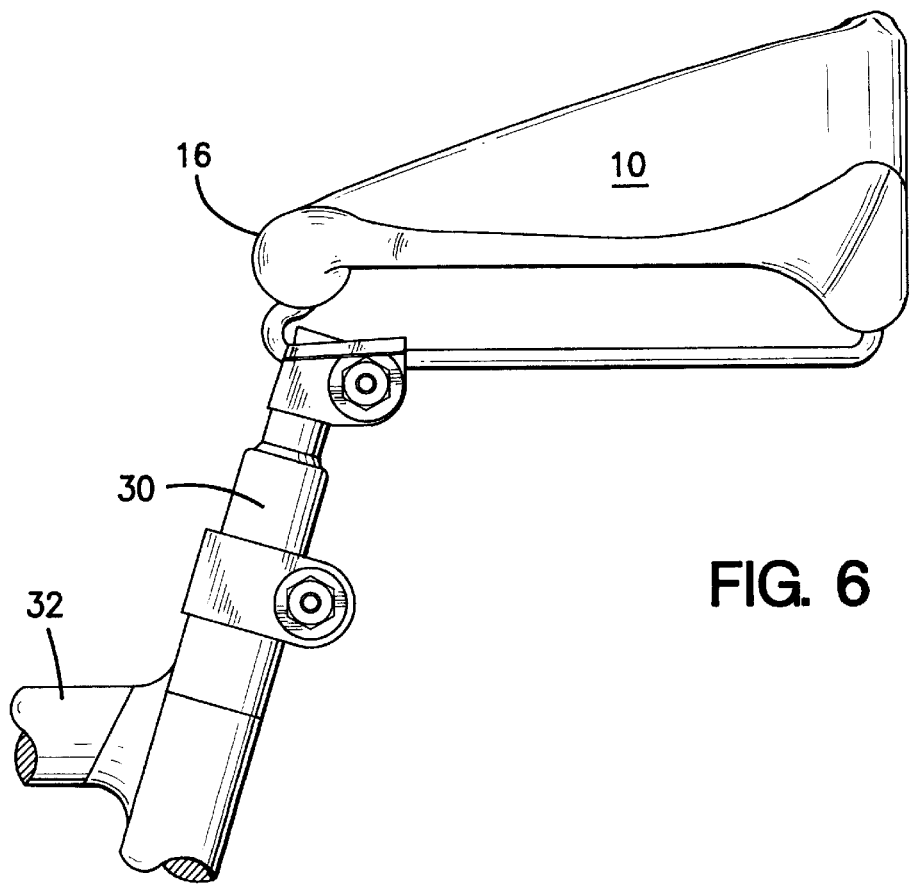
FIG. 6 is a side view showing seat post.

In order to position the cyclist on the seat correctly in relation to the handlebars and pedals, the applicant proposes attachment of the seat 10 to the seat post 30 on the frame 32 at a point very close to the leading edge of the seat. It has been found that by affixing the seat here, only a small adjustment may be required and accordingly the point of attachment should be between the leading edge and a point twenty five millimeters rearwardly of the edge (see FIG. 6).

It is this positioning together of the leading edge of the seat in line with the seat post and the position of the leading edge abutting the physiological creaseline 18 of the cyclist which allows the cyclist to be correctly positioned for comfortable and efficient pedalling.

What is claimed is:

1. A bicycle seat comprising:

a seating surface having rear and side portions molded to support the rear and sides of buttocks of a seated cyclist at least in part, and a front portion having a horizontal leading edge that is tangential to a frontmost edge of said seating surface and is substantially transverse to a frame of a bicycle when the bicycle seat is mounted on a bicycle; and mounting means for attaching said seating surface to a seat post of a bicycle and for permitting adjustable movement of said seating surface from a first position where said leading edge intersects a line that is an extension of a frontmost edge of the seat post to a second position where said leading edge is at least twenty five millimeters forward of the line extended from the frontmost edge of the seat post.

2. The bicycle seat of claim 1, wherein said seating surface includes a pair of spaced part depressions for receiving a cyclist's buttocks in the region of the ischia bones.

3. The bicycle seat of claim 1, wherein said mounting means comprises a mounting bar that is attached to a bottom of said seating surface and that extends from said leading edge to said rear portion.

4. The bicycle seat of claim 3, wherein said mounting means further comprises a gripper that is movably attached to said mounting bar and that moves from a position where said gripper is directly beneath said leading edge to a position where said gripper is directly beneath said rear portion, said gripper including means for attachment to the seat post.

5. A bicycle seat comprising:

a seating member having a D-shape in a plan view, said seating member having an elevated semicircular peripheral portion that surrounds on three sides a generally flat seating area that has a fourth side that defines a leading edge of said seating member that is tangential to the fourth side of the seating area, said fourth side having a central portion that is elevated relative to said seating area and elevated less than said peripheral portion, said semicircular peripheral portion having a rear part with a relatively constant elevation and side parts with elevations that taper from the relatively constant elevation at said rear part to a level of said fourth side so that said seating member has a wedge-shape in a side view, said fourth side having a length connecting said side parts of said semicircular peripheral portion that is greater than a maximum distance from said leading edge to an exterior of said rear part of said peripheral portion as measured perpendicular to said leading edge; and a mounting bar affixed to a bottom of said seating member for attaching said seating member to a seat post of a bicycle, said mounting bar having one end that is at least as far forward as said leading edge and a second end that is at least as far rearward as said rear part, and a straight portion between said first and second ends that is spaced from said bottom of said seating member.

6. The bicycle seat of claim 5, further comprising a gripper that is slidably attached to said mounting bar and a tube attached to said gripper and that is arranged and constructed for removable attachment to a bicycle seat post, whereby said seating member is slidable relative to said tube.

7. The bicycle seat of claim 6, wherein said gripper is slidable on said mounting bar for 25 millimeters.

8. The bicycle seat of claim 5, wherein the length of said four th side is at least one and one-half times the maximum distance from said leading edge to the exterior of said rear part of said peripheral portion as measured perpendicular to said leading edge.

9. The bicycle seat of claim 5, wherein said fourth side has concave parts on both sides of said central portion in the plan view, said central portion of said fourth side not extending beyond a straight line connecting distal ends of said peripheral portion.

10. The bicycle seat of claim 5, wherein said generally flat seating area comprises a pair of spaced apart depressions.

* * * * *